United States Patent
Bitar et al.

(10) Patent No.: US 8,032,352 B2
(45) Date of Patent: Oct. 4, 2011

(54) DEVICE, SYSTEM, AND METHOD OF STORAGE CONTROLLER SIMULATING DATA MIRRORING

(75) Inventors: Akram Bitar, Kfar Peqiin (IL); Aviad Zlotnick, Mitzpeh Netofah (IL)

(73) Assignee: International Business Machines Corporation, Armonk, NY (US)

(*) Notice: Subject to any disclaimer, the term of this patent is extended or adjusted under 35 U.S.C. 154(b) by 715 days.

(21) Appl. No.: 12/117,635

(22) Filed: May 8, 2008

(65) Prior Publication Data

US 2009/0281783 A1 Nov. 12, 2009

(51) Int. Cl.
*G06F 9/44* (2006.01)
*G06F 13/10* (2006.01)
*G06F 13/12* (2006.01)

(52) U.S. Cl. .......... 703/21; 703/20; 703/24; 714/41

(58) Field of Classification Search ............ 703/20, 703/21

See application file for complete search history.

(56) References Cited

U.S. PATENT DOCUMENTS

| | | | |
|---|---|---|---|
| 6,442,709 B1 | 8/2002 | Beal et al. | |
| 6,735,636 B1* | 5/2004 | Mokryn et al. ............. | 710/5 |
| 6,757,841 B1 | 6/2004 | Gitlin et al. | |
| 7,082,390 B2* | 7/2006 | Bergsten ................. | 703/21 |
| 7,467,333 B2* | 12/2008 | Keeton et al. ............ | 714/41 |
| 7,552,044 B2* | 6/2009 | Xu et al. ................ | 703/20 |
| 2007/0038432 A1 | 2/2007 | De Grandmont | |
| 2007/0050686 A1 | 3/2007 | Keeton et al. | |

OTHER PUBLICATIONS

Security Innovation, "Holodeck Enterprise Edition", Help Documentation, version 2.5, Jun. 4, 2004, pp. 1-7, 30-37, 56, 61-65, 74-79, 235-274, retrieved from http://www.securityinnovation.com/holodeck/help/HD_Help_2_5.pdf.*

He et al, "SPEK: A Storage Performance Evaluation Kernel Module for Block Level Storage Systems under Faulty Conditions", IEEE Transactions on Dependable and Secure Computing, vol. 2, Issue 2, Apr.-Jun. 2005.*

Aizikowitz et al, "Component-Based Performance Modeling of a Storage Area Network", Proceedings of the 2005 Winter Simulation Conference, 2005.*

San Extension Source: http://www.protocoltools.com/products/anue/san_extension/index.htm.

* cited by examiner

*Primary Examiner* — Mary Jacob
(74) *Attorney, Agent, or Firm* — Zilka-Kotab, PC

(57) ABSTRACT

Device, system, and method of storage controller simulating data mirroring. For example, an apparatus for simulating data mirroring includes: a storage controller to control a primary storage unit that has data stored therein, wherein the storage controller is able to simulate a process of mirroring data stored in the primary storage unit in response to a mirroring simulation command.

22 Claims, 2 Drawing Sheets

DEVICE, SYSTEM, AND METHOD OF STORAGE CONTROLLER SIMULATING DATA MIRRORING

FIELD

The invention relates to the field of data mirroring, and in particular, to a device, system, and method of storage controller simulating data mirroring.

BACKGROUND

In some computing systems, a host computer utilizes a storage controller in order to access data stored in storage units. For example, the storage controller receives from the host computer requests to read or write data. The storage controller reads or writes the data, respectively, to or from one or more of the storage units. Optionally, the storage controller operates in accordance with data management schemes or structures (e.g., Redundant Arrays of Independent Discs (RAID)), for example, to divide and/or replicate data among multiple hard disk drives, to increase data reliability, or to increase Input/Output (I/O) performance.

An administrator of the computing system may consider replicating data among multiple storage units of the computing system, for example, using a data mirroring process, which replicates a content of a first disk drive onto a second disk drive, or a content from a first storage controller onto a second storage controller. Such a data mirroring process may result in changes in the overall performance of the storage controller and/or the computing system, for example, changes in latency, changes in error rates, or the like. Unfortunately, the system administrator may not be able to fully or successfully estimate in advance the impact of performing a data mirroring process in the computing system.

SUMMARY

Some embodiments of the invention include devices, systems and methods of a storage controller simulating data mirroring.

In some embodiments, an apparatus for simulating data mirroring includes: a storage controller to control a primary storage unit that has data stored therein, wherein the storage controller is able to simulate a process of mirroring data stored in the primary storage unit in response to a mirroring simulation command.

In some embodiments, the storage controller includes a simulation module to simulate mirroring of data from the primary storage unit to a secondary, simulated, storage unit.

In some embodiments, the storage controller is able to intercept one or more commands addressed to the secondary, simulated, storage unit, and wherein the simulation module is able to simulate execution of the one or more commands in accordance with one or more parameters of the secondary, simulated, storage unit.

In some embodiments, the simulation module is able to receive a signal responsive to simulated execution of one or more commands by the secondary, simulated, storage unit.

In some embodiments, the storage controller includes a simulated transfer layer to connect between the simulation module and a simulated network interface of the secondary, simulated, storage unit.

In some embodiments, the simulated transfer layer includes at least one of simulated link selected from the group consisting of: a simulated write link, a simulated read link, a simulated control link, a simulated query link, and a simulated interrupt link.

In some embodiments, the storage controller includes a persistent data structure to store dynamically-changing information associated with the secondary, simulated, storage unit.

In some embodiments, the storage controller includes a latency injector to simulate latency during mirroring simulated by the simulation module.

In some embodiments, the latency injector is able to simulate latency based on a user-configurable distance parameter representing a simulated distance between the primary storage unit and the secondary, simulated, storage unit.

In some embodiments, the latency injector is able to simulate latency based on a latency distribution model.

In some embodiments, the storage controller includes an error injector to simulate one or more errors during the simulated mirroring process.

In some embodiments, the storage controller includes a bandwidth limit simulator to simulate a bandwidth limit during the simulated mirroring process.

In some embodiments, the storage controller includes a performance estimator to measure a performance property of the simulated mirroring process.

In some embodiments, the storage controller is able to intercept one or more Input/Output commands addressed to the secondary, simulated, storage unit, and wherein the simulation module is able to simulate execution of the one or more Input/Output commands in accordance with one or more parameters of the secondary, simulated, storage unit.

In some embodiments, a method for simulating data mirroring includes: controlling a primary storage unit that has data stored therein, the primary storage unit associated with a storage controller; and simulating a process of mirroring data stored in the primary storage unit, in response to a mirroring simulation command received by the storage controller.

In some embodiments, a system of simulating data mirroring includes: a storage controller to control a primary storage unit that has data stored therein, wherein the storage controller includes: a simulation module to simulate mirroring of data stored in the primary storage unit; a latency injector to inject simulated latency into the simulated mirroring; an error injector to inject a simulated error into the simulated mirroring; a bandwidth limit simulator to simulate a bandwidth limit of the simulated mirroring; and a performance estimator to estimate a performance property of the simulated mirroring.

Some embodiments may include, for example, a computer program product including a computer-useable medium including a computer-readable program, wherein the computer-readable program when executed on a computer causes the computer to perform methods in accordance with some embodiments of the invention.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
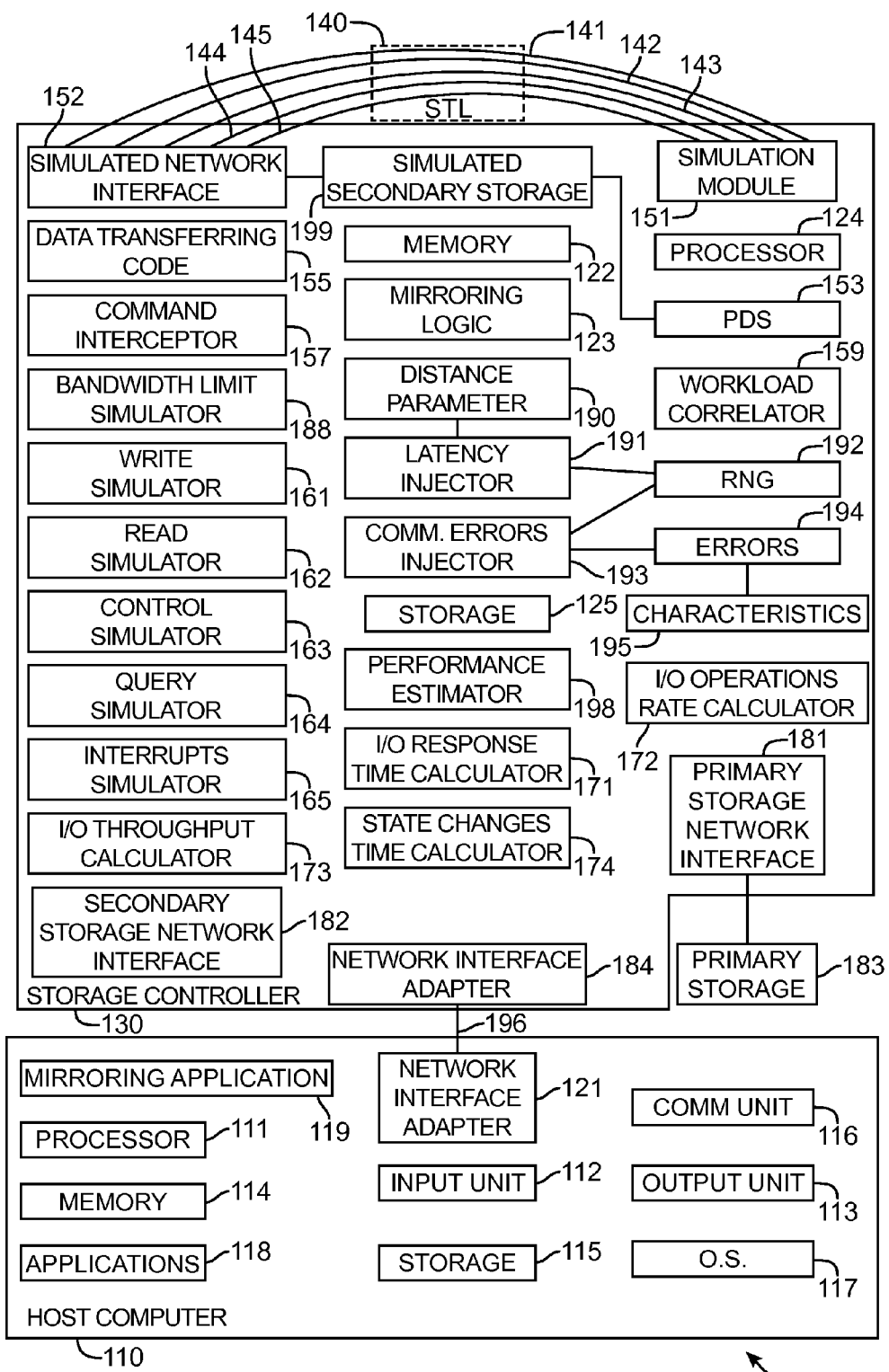
FIG. 1 is a schematic block diagram illustration of a system in accordance with some demonstrative embodiments of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments of the invention may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station, a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a wired or wireless handheld device (e.g., BlackBerry, Palm Treo), a Wireless Application Protocol (WAP) device, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth (®), Global Positioning System (GPS), IEEE 802.11 ("Wi-Fi"), IEEE 802.16 ("Wi-Max"), ZigBee (™), Ultra-Wideband (UWB), Global System for Mobile communication (GSM), 2G, 2.5G, 3G, Third Generation Partnership Project (3GPP), 3.5G, or the like. Embodiments of the invention may be used in various other devices, systems and/or networks.

The terms "volume" or "logical drive" as used herein include, for example, a storage area associated with a single file system; a logical disk; a logical disk residing on a single partition of a single hard disk; a logical disk residing on multiple partitions of a single hard disk; or the like.

The term "storage controller" as used herein includes, for example, a controller or unit able to manage data storage; a controller or unit able to manage external and/or internal physical volumes; a controller or unit able to manage external and/or internal logical volumes; a controller or unit able to operate in accordance with data management schemes or structures (e.g., Redundant Arrays of Independent Discs (RAID)); a controller or unit able to divide and/or replicate data among multiple volumes or hard disk drives (e.g., to increase data reliability, to increase Input/Output (I/O) performance, or the like); a controller or unit able to receive and handle write requests, read requests, and other data-related or storage-related requests (e.g., from a host computer); a controller or device that is connected to or attached to physical volumes; a storage device that includes a controller as well as one or more physical volumes; a storage server; a storage system (e.g., similar to IBM Shark; IBM Power5; Hitachi TagmaStore; EMC Symmetrix; or the like); or other suitable storage managers.

The terms "primary storage" and "secondary storage" as used herein include, for example, storage volumes included in or associated with one or more storage controllers; storage volumes included in or associated with a computing device; storage volumes included in or associated with a host computer; storage volumes included in or associated with internal storage unit(s); storage volumes included in or associated with external storage unit(s), or the like.

The term "simulated volume" as used herein includes, for example, an artificial volume; a "dummy" volume; a "fake" volume; a volume that is not associated with a hard disk drive; a volume simulated or emulated to exist (e.g., by a storage controller); a volume simulated or emulated to operate (e.g., by a storage controller); a volume that does not actually store data that a host attempts to write into it; a volume that does not actually provide data that a host attempts to read from it; a semi-operational volume; a volume that includes some, but not all, of the functionalities of a volume; a volume that write attempts thereto are not written into a hard disk; a volume that read attempts therefrom are not read from a hard disk; or the like.

The terms "host" or "host computer" includes, for example, a computer or a server that initiates a request to read data or write data; a computer or a server that initiates a request to access data or to utilize stored data; a local or remote computer or server; a network-connected computer or server (e.g., in contrast to a network transport device, a router, or a switch); hardware components and/or software components (or combination thereof) that requests to read data or write data; a server computer; a server appliance; a network-connected computer appliance or appliance hardware; a client computer; or the like.

At an overview, some embodiments of the invention include devices, systems, and methods of a storage controller simulating data mirroring, including operations of transferring or replicating information from a primary storage unit to a secondary storage unit, or vice versa. In some embodiments, writing operations on the secondary storage unit are not executed, whereas a successful (or non-successful) completion notification is sent, after a simulation of a controlled response delay.

In some embodiments, applications related to generation of a data mirroring process may include, for example, a simulated ("dummy") target, simulated latency, simulated error injection, injection of various simulated characteristics, or other suitable simulations. In some embodiments, a simulation associated with transfer of data to the secondary storage unit may provide data to the simulated target, and may optionally introduce or inject latency and/or errors, according to a pre-defined input or user-configurable characteristics. Additionally, in some embodiments, a data mirroring simulation may include commands to change definitions of the secondary storage unit, e.g., dynamically, in order to maintain a simulated semantic model thereof. In some embodiments, a simulation code associated with queries sent to the secondary storage unit may satisfy or accommodate the latency and error injection, and may reflect the semantic model.

In some embodiments, a system for simulating data mirroring includes a storage controller associated with a primary storage unit able to store data, wherein the storage controller is to receive a command to simulate a data mirroring process, wherein the storage controller includes a simulation module to simulate the data mirroring process in response to the command. The simulation module is to simulate mirroring of data from the primary storage unit to a secondary, simulated, storage unit. The storage controller is to intercept one or more data mirroring commands addressed to the secondary, simulated, storage unit, wherein the simulation module is to simulate execution of the one or more data mirroring commands in accordance with one or more parameters of the secondary, simulated, storage unit. The secondary, simulated, storage unit is to respond to the data mirroring commands with a signal indicating simulated execution of the one or more data mirroring commands. In some embodiments, other commands (e.g., not necessarily data mirroring commands, but rather, for example, I/O commands) may be processed; for example, such commands are intercepted (e.g., by a command interceptor 157) and if necessary may be processed by the simulation module 151, thereby reflecting latency, errors, the state of the simulated secondary storage unit 199, or the like.

In some embodiments, a controller may generate a Persistent Data Structure (PDS), able to maintain information about the simulated secondary storage unit, including, for example, a name of the secondary storage unit, a Storage Area network (SAN) address, latency associated with the secondary storage unit, an associated path status, and other information associated with the secondary storage unit. In some embodiments, the PDS may include simulated characteristics representing the secondary storage unit, for example, a size, a type, and/or a status thereof. In some embodiments, a data mirroring simulation may include a command ordering the PDS to generate a representation of the secondary storage unit. In some embodiments, in which an option to generate the simulated second storage unit in advance is used, one or more associated commands may respond according to data that is already recorded in the PDS.

In some embodiments, an implementation of an inter-controller data mirroring simulation may return a "success" notification of the data mirroring process, at the end of every simulation, after a period of time corresponding to the simulated latency. Optionally, a portion of the simulations include notification(s) that the data mirroring process (or portions thereof) failed. Optionally, a detailed model of the secondary storage unit may be used, to generate a response time correlated to work loads.

In some embodiments, one or more commands may be used to change a state of the secondary storage unit. Some embodiments may utilize a command to transfer and/or store information about completeness of customer data that is already transferred. For example, if such state information is read by the primary storage unit from the secondary storage unit, a Simulated Transfer Layer (STL) maintains the state information on the PDS, in response to multiple commands. In some embodiments, the STL responds to queries addressed to the secondary storage unit, according to data included in the PDS. In some embodiments, one or more commands may return a "failure" notification, for example, if substantially all simulated paths to the secondary storage unit are in a "down" state.

FIG. 1 schematically illustrates a block diagram of a system 100 in accordance with some demonstrative embodiments of the invention. System 100 includes a host computer 110 connected to a storage controller 130 able to perform data mirroring simulation.

In some embodiments, host computer 110 includes, for example, a processor 111, an input unit 112, an output unit 113, a memory unit 114, a storage unit 115, a communication unit 116, an operating system (OS) 117 and one or more applications 118, including, for example, a data mirroring application 119. Host computer 110 optionally includes other suitable hardware components and/or software components.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller. Processor 111 executes instructions, for example, of (OS) 117 or of the one or more applications 118, including, for example, data mirroring application 119, which may be able to initiate a data mirroring process and/or a simulated data mirroring process.

Input unit 112 includes, for example, a keyboard, a keypad, a mouse, a touch-pad, a joystick, a track-ball, a stylus, a microphone, or other suitable pointing unit or input device. Output unit 113 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a Compact Disk (CD) drive, a CD-ROM drive, a Digital Versatile Disk (DVD) drive, an internal or external database or repository, or other suitable removable or non-removable storage units. Memory unit 114 and/or storage unit 115, for example, store data processed by host computer 110.

Communication unit 116 includes, for example, a wired or wireless transceiver, a wired or wireless modem, a wired or wireless Network Interface Card (NIC), or other unit suitable for transmitting and/or receiving communication signals, blocks, frames, transmission streams, packets, messages and/or data. Communication unit 116 optionally includes one or more antennas.

In some embodiments, some or all of the components of host computer 110 are enclosed in a common housing or packaging, and are interconnected or operably associated using one or more wired or wireless links. In other embodiments, components of server host computer 110 are distributed among multiple or separate devices or locations.

In some embodiments, storage controller 130 may include a processor 124, a storage unit 125, and a memory unit 122. Processor 124 may execute data mirroring logic 123, which may further utilize an internal cache or memory unit 122 for temporary data storage. Processor 124 and memory unit 122 may be similar to processor 111 and memory unit 114, respectively. Memory unit 114 and/or storage unit 125, may store data processed by storage controller 130.

In some embodiments, host computer 110 may include a Network Interface (NI) adapter 121, to adapt host computer 110 to be connected to a network. Storage controller 130 may include a NI adapter 184, to adapt storage controller 130 to be connected to a network. NI adapters 121 and 184 may interconnect host computer 110 and storage controller 130, using a link 196, that may include, for example, a wired linked, a wireless link, a combination thereof, or the like.

In some embodiments, storage controller 130 may include a simulation module 151 to simulate a data mirroring process, for example, between a primary storage unit 183 and an additional, secondary storage unit connected thereto, e.g., using a secondary storage NI 182, or included in a second, remote, storage controller. Primary storage 183 may be connected to storage controller 130 using a primary storage NI 181, which may include a socket, a Universal Serial Bus (USB) connection, or other suitable components.

Simulation module 151 may include, for example, an application, a code, a memory, logic components, hardware components, software components, a combination thereof, or the like. For example, in some embodiments, data mirroring logic 123 is included in simulation module 151, and may include logical components associated with data mirroring simulation. Data mirroring logic 123 may intercept commands, for example, generated by computer host 110, associated with a data mirroring simulation, and transfer the intercepted commands to the simulation module 151.

Simulation module 151 may be associated with a Persistent Data Structure (PDS) 153, including, for example, information (e.g., in a database or other structure) about a simulated ("dummy") secondary storage 199, included in storage controller 130 simulated secondary storage 199 may be a simulated volume, into which a data mirroring is simulated. PDS 153 may include information about simulated characteristics of simulated secondary storage 199, for example, size, physical remoteness from the primary storage 183, information stored within, and/or other suitable characteristics. Information stored in PDS 153 may dynamically change, for example, according to simulated changes occurring during the simulated data mirroring process.

In some embodiments, simulation module 151 may be associated with a simulated NI 152, simulating a network interface of simulated secondary storage 199. Simulation module 151 may include a Simulated Transfer Layer (STL) 140, responsible for transferring information between simulation module 151 and simulated NI 152. STL 140 may include multiple links, for example, a "write" link 141, a "read" link 142, a "control" link 143, a "query" link 144 and an "interrupt" link 145, the links connecting simulation module 151 and simulated NI 152. Links 141-145 may simulate links associated with a data mirroring process, and may transfer data associated with multiple information aspects of the simulated mirroring. For example, "write" link 142 may simulate the transfer of data associated with writing data from the primary storage 183 to simulated secondary storage 199. In some embodiments, transfer of data to the simulated secondary storage 199 may be only simulated, and may not include actual transfer or writing of data. Instead, storage controller 130 or the simulation module 151 may respond as if data was transferred.

In some embodiments, simulation module 151 may include a data transferring code 155, to simulate a transferring of data from primary storage 183 to simulated secondary storage 199. Data transferring code 155 may receive information from multiple components, the information including dynamically changing information associated with a simulation process, as described herein.

In some embodiments, storage controller 130 may include a command interceptor 157, to intercept commands and inputs, received, for example, from host computer 110. For example, command interceptor 157 may intercept commands associated with a real, or a simulated, data mirroring process, and may transfer the commands to a suitable component of storage controller 130, for example, simulation module 151.

In some embodiments, simulation module 151 may include components to simulate operations and/or data associated with a data mirroring process, and, for example, to transfer the simulated data to the data transferring code 155. For example, a write simulator 161 may simulate a writing process from primary storage 183 to a secondary storage. Associated simulated data may be transferred between simulation module 151 and simulated NI 152 using, for example, "write" link 141. A read simulator 162 may simulate a reading process by primary storage 183, of data included in a secondary storage. Associated simulated data may be transferred between simulation module 151 and simulated NI 152 using, for example, "read" link 142. A control simulator 163 may simulate a controlling process, performed by a storage controller during a mirroring. Associated simulated data may be transferred between simulation module 151 and simulated NI 152 using, for example, "control" link 143. A query simulator 164 may simulate a querying process, performed by a storage controller during a mirroring. Associated simulated data may be transferred between simulation module 151 and simulated NI 152 using, for example, "query" link 144. An interrupt simulator 165 may simulate a process of interruption, performed by a storage controller, possibly occurring during a mirroring. The associated simulated data may be transferred between simulation module 151 and simulated NI 152 using, for example, "interrupt" link 145. A bandwidth limit simulator 188 may simulate, for example, a process of limiting a number of data mirroring operations performed by system 100 in parallel, according to a pre-defined input and based on the number of bytes transferred in the simulated mirroring process. For example, the predefined input may include properties or characteristics or values of simulated bandwidth connecting storage controller 183 and a secondary storage.

In some embodiments, additional information, associated with additional performed simulations, and/or input data entered by a user, may or transferred to simulation module 151. For example, in some embodiments, a value of a distance parameter 190 may be entered by a user, specifying a simulated physical remoteness or distance between storage controller 130, and a second controller including a secondary storage volume, for example, simulated secondary storage 199. Distance parameter 190 may generate a simulated latency, associated with the input distance. For example, if a relatively significant distance between the two controllers is entered or defined, simulation module 151 may simulate a corresponding significant latency; whereas if a relatively small distance between the two controllers is entered or defined, simulation module 151 may simulate a corresponding relatively negligible latency.

As another example, in some embodiments, a latency injector 191 may simulate an additional latency, occurring in an actual data mirroring process. For example, latency injector 191 may simulate a statistical latency, characteristics of which (e.g., probability, distribution, or the like) are associated with a pre-defined latency distribution model, for example, a normal distribution model, a random model, a semi-random model, a combination thereof, or other suitable models. A communication errors injector 193 may simulate one or more errors 194, corresponding to errors occurring during a data mirroring process, for example, due to transferring of data through a network or over a link. The simulated errors 194 may be generated according to a pre-defined scheme or error distribution model. For example, multiple characteristics 195 of the simulated errors 194 (e.g., frequency, characteristics and magnitude of the errors 194) may correspond to characteristics of communication errors occurring during a real data mirroring process. A Random Number Generator (RNG) 192 may be associated with the latency injector 191 and the communication errors injector 193, and generate one or more random or pseudo-random numbers, used by latency injector 191 and/or communication errors injector 193, for generating the simulated latency, and/or simulated errors, respectively. For example, RNG 192 may generate a random number, using a normal distribution model, used by latency injector 191 to generate a latency having a magnitude, according to a normal distribution model.

In some embodiments, an Input/Output (I/O) response time calculator 171 may calculate a simulated response time, for example, necessary for a secondary storage to send feedback associated information, or other suitable response times. I/O response time calculator 171 may simulate the response time according to a pre-defined scheme, the scheme including, for example, data entered by a user, concerning characteristics of a simulated data mirroring process, data from communication errors injector 193, data from distance parameter 190, or the like. Additionally, the pre-defined scheme may include data received by a workload correlator 159, which may simulate a workload associated with a data mirroring process. For example, workload correlator 159 may amplify significantly a value of a simulated response time, if a relatively high workload is simulated.

In some embodiments, an I/O operations rate calculator 172 may calculate a simulated, dynamically changing operations rate, and, for example, display to a user an updated estimate of an updated simulated operations rate. For example, in a specific moment during a data mirroring process simulation, an operations rate may be set by I/O operations rate calculator 172, according to multiple simulated factors (e.g., simulated pseudo-random errors, simulated latency, or the like). During the data mirroring simulation, one or more values corresponding to the simulated factors may change, e.g., randomly, pseudo-randomly, or in accordance with other simulated factors. In some embodiments, I/O operations rate calculator 172 may process changes in values of the changed factors, and dynamically set a simulated updated operations rate values, transferred to, and processed by, a throughput calculator 173, that may calculate a simulated, dynamically changing throughput rate. For example, in a specific moment during a data mirroring simulation, a throughput rate may be set by throughput rate calculator 173, according to multiple simulated factors (e.g., simulated distance parameter, simulated workload, or the like). During the data mirroring simulation, one or more values of the simulated factors may change. Throughput rate calculator 173 may process changes in values of the factors, and, for example, display the throughput rate to a user. In some embodiments, a state changes time calculator 174 may calculate a time interval between consecutive changes of states, for example, states of a secondary storage, and display to a user an updated estimate of the time interval between the changes of states.

In some embodiments, storage controller 130 may include a performance calculator or estimator 198, to evaluate or measure a performance of a simulated data mirroring. Performance estimator 198 may process data received, for example, from PDS 153, state changes time calculator 174, simulation module 151 and/or multiple other suitable components. In some embodiments, for example, performance estimator 198 may send performance estimation to output unit 113 of host computer 110, to display corresponding performance data to a user.

In some embodiments, system 100 may be used to evaluate the operation of a data mirroring process, without performing an actual data mirroring process. For example, system 100 may be used to evaluate, predict or estimate an impact or effects of a data mirroring process on multiple applications of system 100, prior to performing a data mirroring process. As another example, a user may evaluate an operation of a data mirroring process, when a new code, associated with a primary storage, is tested. As an additional example, system 100 may be used to evaluate the operation of a data mirroring process, when tuning or fine-tuning is performed. In the above-described examples, system 100 may eliminate the need to configure or set-up a primary storage, a secondary storage, and/or a connecting infrastructure, to perform the above-described operations. In yet an additional example, system 100 may be used to test scripts related to data mirroring before applying the scripts to a "production" system.

Although portions of the discussion herein relate, for demonstrative purposes, to a storage controller able to simulate data mirroring commands or able to simulate commands that carry data, some embodiments may include, for example, a storage controller able to simulate other types of commands, e.g., commands that do not necessarily carry data, state-change commands, Input/Output commands, or other suitable commands. Accordingly, the simulated secondary storage unit 199 may be able to respond, or to simulate a response, to various types of commands which may be addressed to a secondary storage unit or a secondary storage controller.

Figure 2:
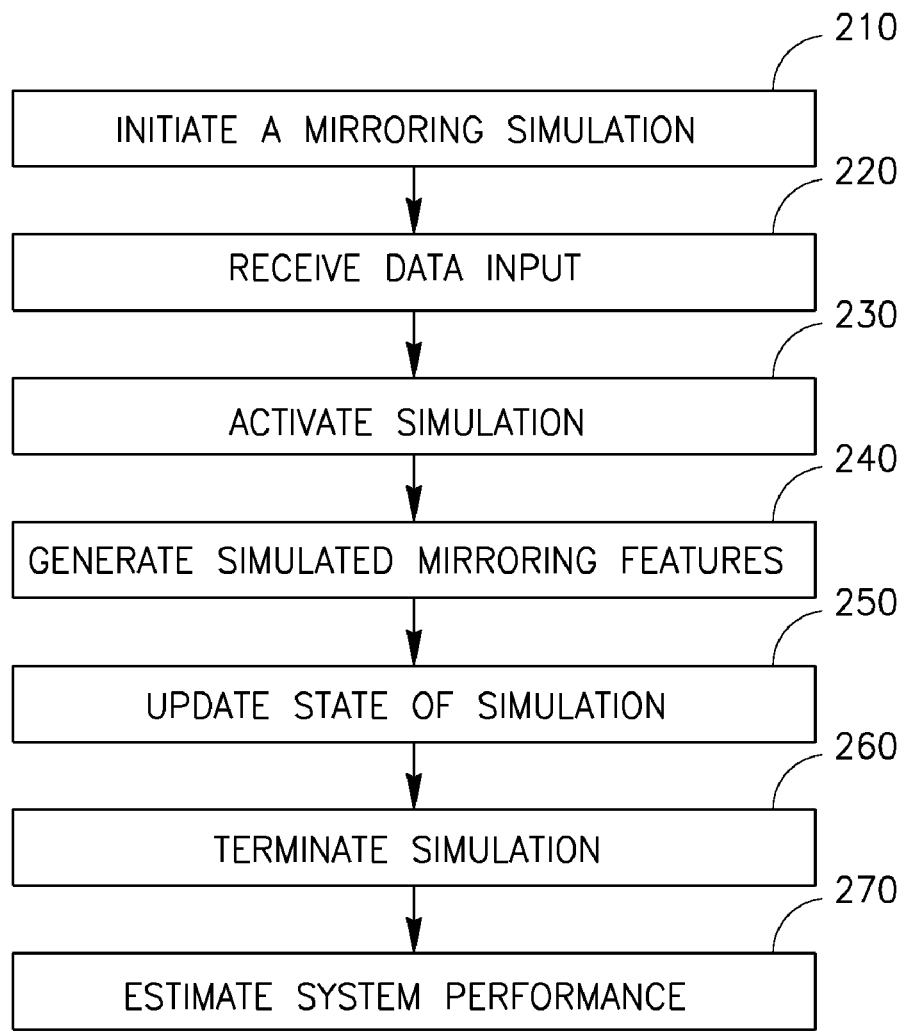
FIG. 2 is a schematic flow-chart of a method of simulating data mirroring in accordance with some demonstrative embodiments of the invention.

FIG. 2 schematically illustrates a flow chart of a method of simulating data mirroring in accordance with some demonstrative embodiments of the invention. Operations of the method may be used, for example, by system 100 of FIG. 1, by host computer 110 of FIG. 1, by storage controller 130 of FIG. 1, and/or by other suitable units, devices, and/or systems.

In some embodiments, the method may include, for example, initiating a data mirroring simulation (block 210). This may be performed, for example, by computer host 110, operated by a user.

In some embodiments, the method may include, for example, receiving input data, to simulate a process of a data mirroring (block 220). The input data may include, for example, physical remoteness or distance between two storage locations or two storage units involved in the data mirroring, bandwidth connecting the two storages or two storage units, attributes of data transferred between the two storages or two storage units, and other suitable data input. The input data may be entered, for example, by a user operating the system 100.

In some embodiments, the method may include, for example, activating the data mirroring simulation (block 230). The simulation may be activated, for example, by simulation module 151, activating features and applications related to the simulation. The simulation may be performed according to the data input entered by the user.

In some embodiments, the method may include, for example, generating simulated mirroring features (block 240). The generating may include, for example, injecting latency, generating one or more random numbers, injecting communication errors, calculating response time, transferring simulated data according to above-mentioned features, or the like.

In some embodiments, the method may include, for example, updating state of the simulation (block 250). The updating may include, for example, sending a feedback of a rate of the simulated data transferring, a feedback of amount of data that was already transferred, a feedback of a simulated current rate of data transferring, or the like.

In some embodiments, the method may include, for example, terminating the data mirroring simulation (block 260). In some embodiments, the simulated data mirroring may terminate if substantially all the data is simulated to be transferred, or if the data mirroring fails to simulate transferring of a data portion, for example, over a pre-defined time period, or other pre-defined thresholds.

In some embodiments, the method may include, for example, estimating performance of the simulation (block 270). The estimating may include, for example, processing information concerning performance features of the simulation. For example, estimating the duration of transferring of the data, estimating the average rate of transferring of data, or the like. In some embodiments, the method may additionally include displaying estimation of performance, for example, to a user, operating the system 100.

Other suitable operations or sets of operations may be used in accordance with embodiments of the invention.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, or transport the program for use by or in connection with the instruction execution system, apparatus, or device.

In some embodiments, the medium may be an electronic, magnetic, optical, electromagnetic, or semiconductor system (or apparatus or device). Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CDROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments of the invention have been illustrated and described herein, many modifications, substitutions, changes, and equivalents may occur to those skilled in the art. It is, therefore, to be understood that the appended claims are intended to cover all such modifications and changes.

What is claimed is:

1. An apparatus for simulating data mirroring, the apparatus comprising:
a storage controller to control a primary storage unit that has data stored therein, wherein the storage controller is able to simulate a process of mirroring data stored in the primary storage unit in response to a mirroring simulation command, the storage controller comprising:
a simulation module to simulate mirroring of data from the primary storage unit to a secondary, simulated, storage unit; and
a latency injector to inject simulated latency during simulated mirroring.

2. The apparatus of claim 1, wherein the storage controller is able to intercept one or more commands addressed to the secondary, simulated, storage unit, and wherein the simulation module is able to simulate execution of the one or more commands in accordance with one or more parameters of the secondary, simulated, storage unit.

3. The apparatus of claim 2, wherein the simulation module is able to receive a signal responsive to simulated execution of one or more commands by the secondary, simulated, storage unit.

4. The apparatus of claim 2, wherein the storage controller is able to intercept one or more Input/Output commands addressed to the secondary, simulated, storage unit, and wherein the simulation module is able to simulate execution of the one or more Input/Output commands in accordance with one or more parameters of the secondary, simulated, storage unit.

5. The apparatus of claim 1, wherein the storage controller comprises a simulated transfer layer to connect between the simulation module and a simulated network interface of the secondary, simulated, storage unit.

6. The apparatus of claim 5, wherein the simulated transfer layer comprises at least one simulated link selected from the group consisting of: a simulated write link, a simulated read link, a simulated control link, a simulated query link, and a simulated interrupt link.

7. The apparatus of claim 1, wherein the storage controller comprises a persistent data structure to store dynamically-changing information associated with the secondary, simulated, storage unit.

8. The apparatus of claim 1, further comprising:
the latency injector simulates latency based on a user-configurable distance parameter representing a simulated distance between the primary storage unit and the secondary, simulated, storage unit.

9. The apparatus of claim 8, further comprising:
the latency injector simulating latency based on a latency distribution model.

10. The apparatus of claim 1, wherein the storage controller further comprises:
an error injector to simulate one or more errors during the simulated mirroring process.

11. The apparatus of claim 1, wherein the storage controller further comprises:
a bandwidth limit simulator to simulate a bandwidth limit during the simulated mirroring process.

12. The apparatus of claim 1, wherein the storage controller further comprises:
a performance estimator to measure a performance property of the simulated mirroring process.

13. A method for simulating data mirroring, the method comprising:
controlling a primary storage unit that has data stored therein, the primary storage unit associated with a storage controller;
simulating a process of mirroring data stored in the primary storage unit, in response to a mirroring simulation command received by the storage controller; and
injecting simulated latency during simulated mirroring, the simulated latency based on a user-configurable distance parameter representing a simulated distance between the primary storage unit and a secondary, simulated, storage unit.

14. The method of claim 13, comprising:
intercepting one or more commands addressed to the secondary, simulated, storage unit; and
simulating execution of the one or more commands in accordance with one or more parameters of the secondary, simulated, storage unit.

15. The method of claim 14, comprising:
receiving a signal responsive to simulated execution of one or more commands by the secondary, simulated, storage unit.

16. The method of claim 14, comprising:
storing dynamically-changing information associated with the secondary, simulated, storage.

17. The method of claim 13, comprising:
injecting latency during mirroring simulated by the simulation module, based on a latency distribution model.

18. The method of claim 13, comprising:
injecting at least one simulated error during the simulated mirroring.

19. The method of claim 13, comprising:
simulating a bandwidth limit during the simulated mirroring process.

20. The method of claim 13, comprising:
estimating a performance property of the simulated mirroring process.

21. A computer program product comprising:
a non-transitory computer useable medium having computer usable program code embodied therewith, the computer usable program code comprising:
computer usable program code configured to control a primary storage unit that has data stored therein, the primary storage unit associated with a storage controller;
computer usable program code configured to simulate a process of mirroring data stored in the primary storage unit, in response to a mirroring simulation command received by the storage controller; and
computer usable program code configured to inject simulated latency during simulated mirroring, the simulated latency based on a user-configurable distance parameter representing a simulated distance between the primary storage unit and a secondary, simulated, storage unit.

22. A system of simulating data mirroring, the system comprising:
a storage controller to control a primary storage unit that has data stored therein, wherein the storage controller comprises:
a simulation module to simulate mirroring of data stored in the primary storage unit;
a latency injector to inject simulated latency into the simulated mirroring;
an error injector to inject a simulated error into the simulated mirroring;
a bandwidth limit simulator to simulate a bandwidth limit of the simulated mirroring; and
a performance estimator to estimate a performance property of the simulated mirroring.

* * * * *